April 16, 1940.　　　A. M. MOSHER　　　2,197,505
CENTER PUNCH GAUGE
Filed Oct. 24, 1938　　　2 Sheets-Sheet 1
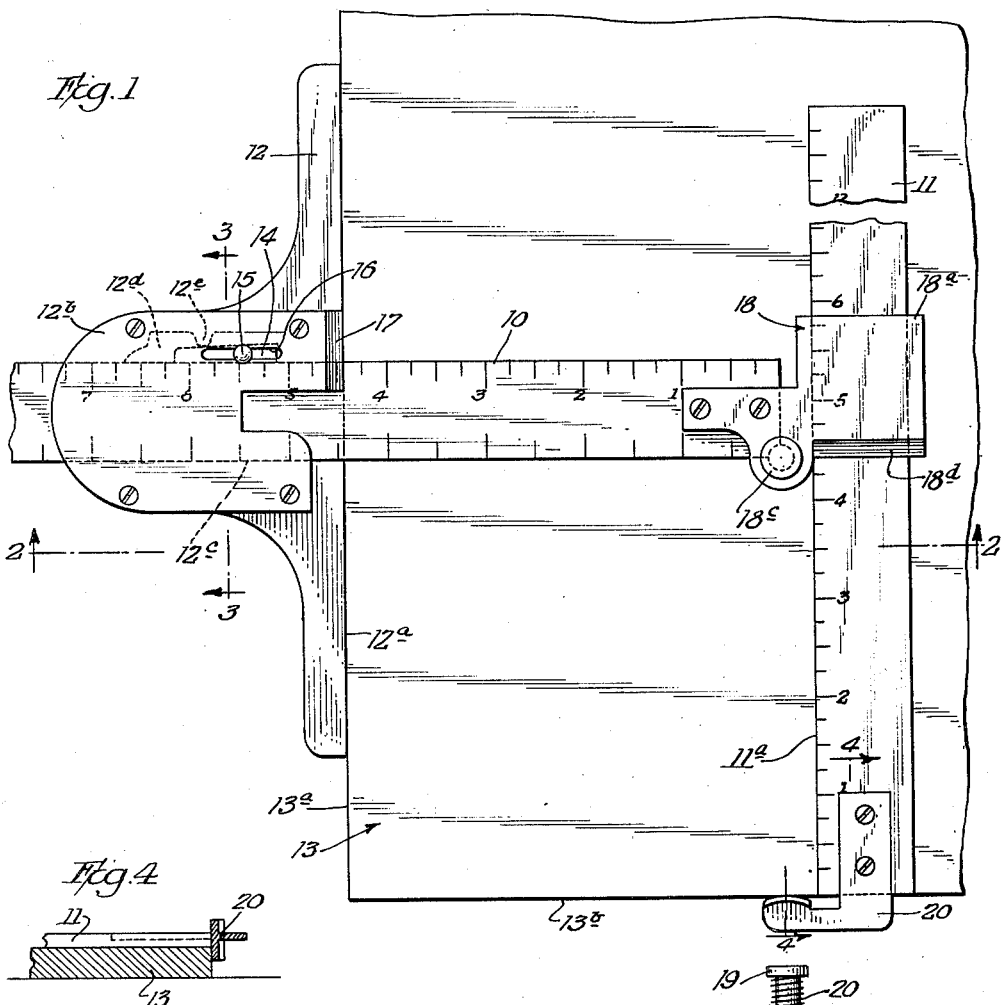
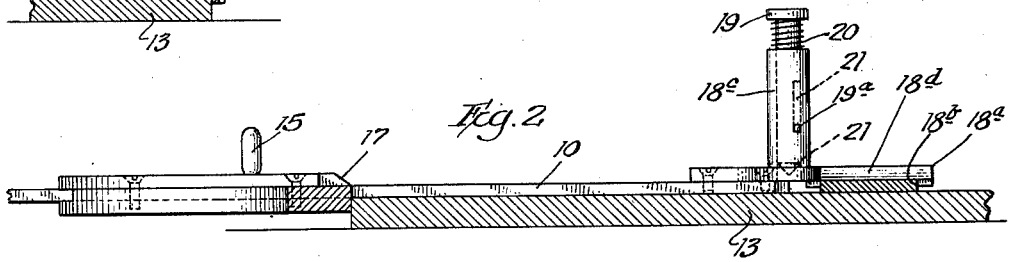
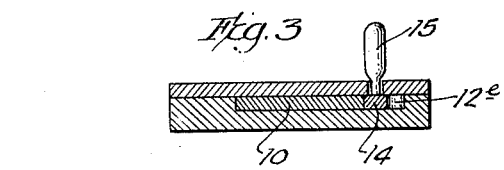
Inventor:
Arthur M. Mosher April 16, 1940.  A. M. MOSHER  2,197,505
CENTER PUNCH GAUGE
Filed Oct. 24, 1938  2 Sheets-Sheet 2
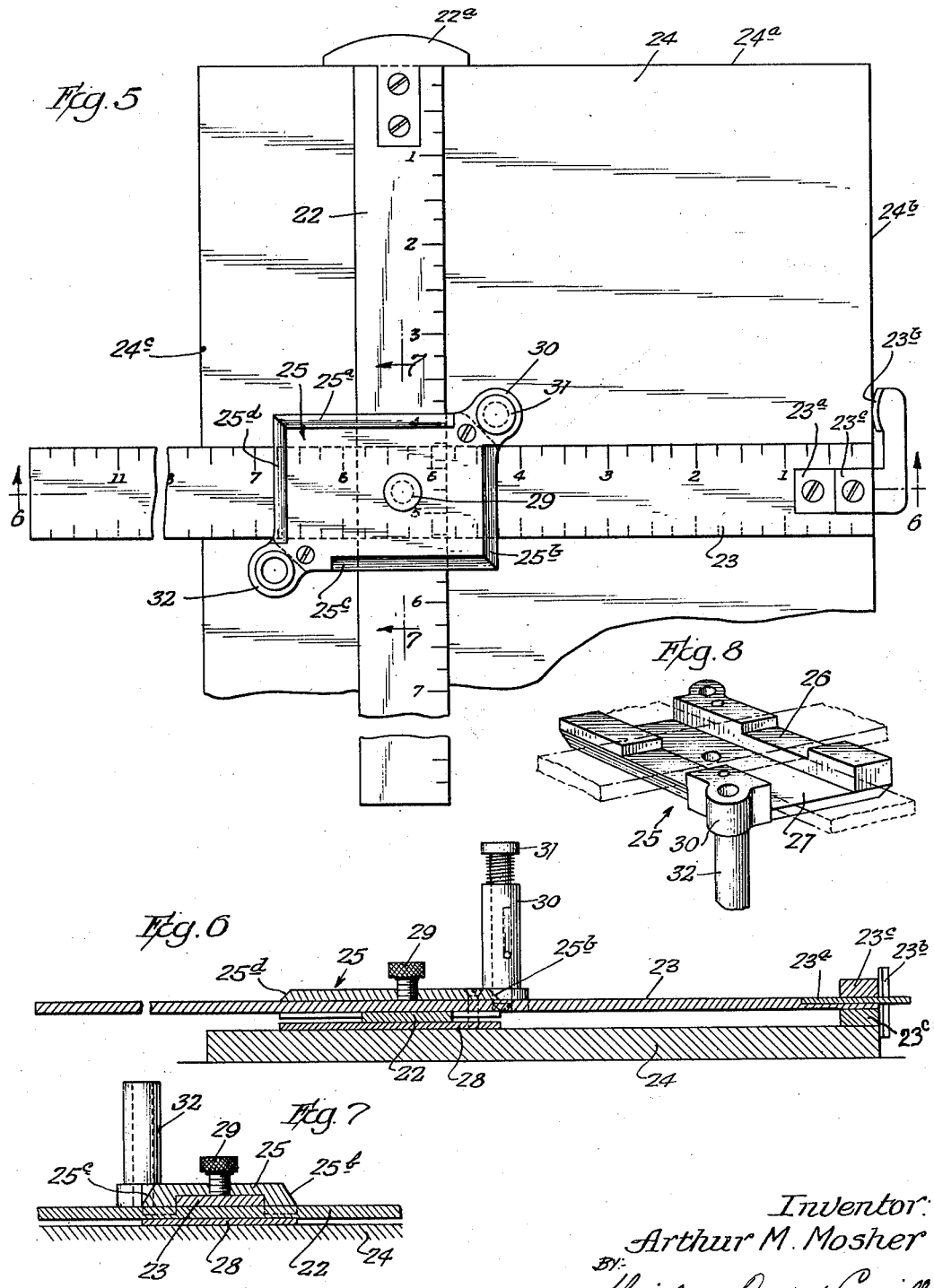

Patented Apr. 16, 1940

2,197,505

UNITED STATES PATENT OFFICE 2,197,505

CENTER PUNCH GAUGE

Arthur M. Mosher, Chicago, Ill.

Application October 24, 1938, Serial No. 236,636

6 Claims. (Cl. 33—189)

This invention relates to improvement in center punch gauges.

In locating centers for boring or drilling in work pieces in tool or machine shops, various modes of determining such centers are used, but generally the workman locates the point to be punched by carefully measuring from adjacent edges of the piece, scribes intersecting lines and at the point of intersection indicates the center by a prick punch.

It is an object of the present invention to provide a gauge whereby such measurements can be effected accurately and expeditiously and the center point indicated by a punch mark without first inscribing the intersecting lines mentioned.

Another object of the invention is to provide a gauge of the character mentioned which is provided with two graduated scales each for effecting a measurement from one of two adjacent edges of a work piece and which scales, while slidable relative one to the other for effecting the desired measurements, always bear a predetermined angular relation one to the other and likewise to a center or prick punch which will always be located at the desired center determined by the relative adjustment of the scales.

A further object of the invention is to provide a gauge of the character mentioned provided with a pair of cooperating scales provided with a punch guide or carrying member adjustable relatively to one or both scales and retaining the scales in fixed angular relationship, which member is provided with a center or prick punch guide which locates the center of a punch at the point of intersection of two imaginary lines determined by the relative longitudinal adjustment of the scales.

Other objects of the invention relate to various features of construction and arrangement of parts which will be apparent from a consideration of the following specification and accompanying drawings, wherein:

Fig. 1 is a top plan view of a gauge resting on a work piece and embodying the present improvements;

Fig. 2 is a sectional view taken on line 2—2 of Fig. 1;

Fig. 3 is a sectional view taken on line 3—3 of Fig. 1;

Fig. 4 is a sectional view taken on line 4—4 of Fig. 1;

Fig. 5 is a top plan view of a modified form of gauge shown in gauging position on the top of a work piece;

Fig. 6 is a sectional view taken on line 6—6 of Fig. 5;

Fig. 7 is a sectional view taken on line 7—7 of Fig. 5; and

Fig. 8 is a detached perspective view of the lower side of the scale guide member shown in Fig. 5.

In Figs. 1 to 4 of the drawings, the embodiment of the invention therein illustrated comprises a pair of scales 10 and 11, the scale 10 being provided with a head 12 through which the scale 10 is adjustable longitudinally. The head 12 has a straight edge 12a adapted to be placed against one edge of a work piece 13 such as a steel plate, casting or the like, in which a hole or holes are to be drilled at a predetermined location or locations. The head 12 is provided with a top plate 12b beneath which the scale 10 slides in a groove or channel 12c at a predetermined angle with reference to the straight edge 12a, such as a right angle.

Communicating with the channel 12c is a recess 12d provided with a boss or abutment 12e as shown in Fig. 1 with which a slidable wedge 14 contacts and is pressed against the adjacent edge of the scale 10 when the wedge 14 is moved to locking position, that is, is moved to the left from the position shown in Fig. 1. The wedge is provided with a small handle or finger piece 15 which projects through a slot 16 in the plate 12b. The plate is also shown as being provided with a bevel 17, the edge of which lies in the vertical plane of the straight edge 12a for convenience and accuracy in reading the graduations on the scale 10. Where a hole is to be drilled a predetermined distance from the left hand edge of the work piece 13, the scale 10 is adjusted within the head to indicate such distance and is locked in that position by means of the wedge 14.

The forward end of the scale 10 is provided with a guide member indicated generally by the numeral 18 which comprises a portion 18a extending beyond the end of the scale 10. The portion 18a is provided with a channel 18b in its lower surface which guides the second scale 11 and always retains the latter at a predetermined angle with reference to the scale 10 such as the right angle shown in the drawings. The member 18 is also provided with a vertical sleeve 18c for receiving a prick punch 19 which, in the form shown in Fig. 2, for example, is movable within the sleeve 18c and normally is held in elevated position by a light spring 20. The lower end of the punch is pointed as indicated at 21 so that when the punch is tapped lightly, the point will prick a center point in the work piece.

The portion 18a of the guide member 18 is provided with a bevel edge 18d for convenience in reading the graduations of the scale 11. The axial center of the sleeve 18c is located at the point of intersection of a line drawn through the zero point of scale 10 and the edge of the bevel 18d of the member 18. The scale 10 having been adjusted for locating a center at a predetermined distance from the left hand edge of the work piece 13 and the scale having been locked to the head as above described, the scale and head are placed on the work piece as shown in Fig. 1. The scale 10 and head 12 are then moved along the edge until the edge of the bevel 18d indicates on the scale 11 the desired distance of the hole from the bottom edge of the work piece and against which a stop 20 carried by the scale 11 abuts. The scales 10 and 11 will be at right angles one to the other due to the disposition of the scale 10 in the guiding channel 18b of the member 18.

When the scale 10 has been moved along the scale 11 as above mentioned until the edge of the bevel 18d coincides with the graduation of the scale 11 which indicates the desired distance of the hole from the lower edge of the work piece, the punch 19 is tapped with a mallet, for example, to prick the point which constitutes the center of the hole to be drilled. Since the axial center of the sleeve and therefore of the punch 19 lies at the point of intersection of lines projected respectively through the zero point of scale 10 and the edge of the bevel 18d, the prick point made by the punch will be located at distances from the left hand and lower edges of the work piece that are indicated by the respective scales 10 and 11. By the use of the gauge, it is not necessary for the workman to scribe intersecting lines on the surface of the work piece to locate the exact center sought but, as will be obvious, this result can be attained by the adjustment of the two scales which are held in a predetermined angular position and automatically locate the center of the punch at the respective distances indicated by the two scales.

For the purpose of making the described instrument useful in marking centers located at distances measured from adjacent non-normal edges of a work piece, the stop member as shown in Fig. 1 preferably is provided with an edge contacting portion 20a which is curved in horizontal section, the vertical line of the crest of the convex side of the stop preferably being located in alignment with the center point of the sleeve 18c whereby accuracy of location of the center point will be effected whether the lower edge 13b of the work piece is disposed at a right angle to the adjacent left-hand edge 13a or at an acute or obtuse angle.

In Fig. 2 of the drawings, the punch 19 is shown provided with a lateral pin 19a which operates within a vertical slot 21 of the sleeve 18c to avoid axial displacement or loss of the punch from the sleeve.

In the form of the invention shown in Figs. 5 to 8, inclusive two scales 22 and 23 are provided each having a stop member 22a, 23a, respectively which are adapted to abut adjacent edges of a work piece 24 in which the center of a hole to be drilled is to be indicated. A guide member indicated generally by the numeral 25 is provided preferably having four beveled edges 25a, 25b, 25c and 25d and having intersecting slots or channels 26 and 27 as shown in Fig. 8 which is an inverted perspective view of the guide member with the bottom plate removed. The scale 22 is adapted to slide within the channel 26 while scale 23 is arranged to slide within the channel 27. A thin plate 28 is attached to the bottom of the guide member to retain the scale 22 within the channel 26. A set screw 29 preferably is provided which is arranged to engage the scale 23 and press the same frictionally into contact with the subjacent scale 22 to lock the same in adjusted position with reference to the guide member.

In the use of this form of gauge, the scales are adjusted with reference to the guide member for indicating the distance of the center of the opening or hole to be drilled from the respective edges of the work piece, for example, from edges 24a and 24b. When the scales are thus adjusted, the graduations being read at the edges of the bevels 25a and 25b, respectively, the knurled screw 29 is tightened to lock the scales in adjusted positions and the gauge is then laid upon the work piece with the stops 22a and 23a in contact respectively with the edges 24a and 24b, respectively, of the work piece.

A sleeve 30 for a center punch 31 is provided as part of the guide member 25 and the axial center of the sleeve is disposed at the point of intersection of lines projected from the edges of bevels 25a—25b, respectively. Hence, when the scales have been adjusted as above described and placed upon the work piece, the point of the center punch will be disposed at a point distant from the respective edges 24a—24b of the work piece as shown by the scales 22 and 23. The center punch is then tapped with a suitable tool to prick the center which generally will be enlarged by a hand punch before the drilling operation.

The guide member 25 at the corner thereof disposed diagonally from the sleeve 30 may be provided with an additional sleeve 32 to which may be transferred the punch 31 or it may carry a separate punch, if desired. This additional sleeve 32 with the punch therein is useful where the center to be located is closely adjacent one of the edges such as edge 24c of a work piece 24. Where the center to be marked lies close to such edge 24c, for example, the workman may set the scales 22 and 23 with reference to the bevel edges 25c and 25d, lines projected from which intersect at the center of the sleeve 32. Hence, the point marked by a punch in the sleeve 32 will be the distance from edges 24a—24b indicated by the scales 22 and 23 when read along the measurement indicating edges of bevels 25c—25d, respectively. This construction is of convenience especially where the point to be marked is so close to an edge, such as edge 24c of the work piece, as to be inaccessible to the punch when located in the sleeve 30.

The stop member 22a is of a form which when pressed against the edge 24a is adapted to effect the disposition of the scale 22 at right angles to said edge of the work piece while stop member 23a has a curved or convex edge contacting portion 23b offset laterally into alignment with the axial center line of the bushing 30. Thus, whether the edge 24b of the work piece is disposed at right angles or otherwise with respect to the edge 24a, the center of the punch will be located from edge 24b the distance indicated by scale 23. Where the punch sleeve 32 is to be employed on a work piece, the edge 24b of which is not at right angles to the base or other edge 24b, the scale 23 is first withdrawn from the guide 25 and replaced in reversed or upside down position (there being graduation of the reverse side also) whereby the center contact line of the convex portion 23b, which extends beyond opposite faces of the scale, will be disposed in alignment with the center line of the sleeve 32. The distance of the point of the punch from the edge 24b will thus be accurately indicated by the scale 23 when reading the graduations along the measurement indicating edge 25d. Where edge 24b is at right angles to the edge 24a, the scale 23 may be used in either position mentioned. The scale 23 preferably is provided with a pair of spacer blocks 23c, one of which, depending on the position of the scale in the guide 25, will retain the scale in parallel position with respect to the work piece during the gauge and center marking operation.

By means of the present improvements, a workman can mark the desired centers accurately by the adjustment of the scales and locating the gauge upon the work piece with the stops in contact with the adjacent edges thereof and thereafter tapping the center punch as described. The necessity of scribing lines upon the work piece is eliminated and the inaccuracies inherent in the making of individual measurements from the edges of the work piece and then scribing intersecting lines to mark the center point as has been generally done heretofore are avoided by the present improvements.

While I have described and disclosed certain embodiments of my improvements for the purpose of illustration, it will be seen that various changes and modifications may be made therein without departing from the spirit of the invention.

What I claim as new and desire to cover by Letters Patent is:

1. A center punch gauge and marking device comprising a head adapted to contact an edge of a work piece, a scale carried by said head and adjustable within the same for predetermining a distance from said edge of the work piece, a guide member carried by the inner end of said scale and provided with a guide channel, a second scale in said channel disposed at a predetermined angle with respect to said first scale and adjustable longitudinally therein for predetermining a distance from the adjacent edge of said piece, a sleeve for a center punch carried by said guide member and disposed in a position offset laterally from said second scale and arranged coaxially with respect to a center determined by the intersection of imaginary lines each normal to one scale and each disposed from an edge of the work piece a distance corresponding to the setting of the respective scales, and a stop member for the second scale offset laterally therefrom and in alignment with said sleeve.

2. A center punch gauge comprising a guide member provided with guide channels for a pair of scales arranged at a predetermined angle one to the other, relatively adjustable scales in said channels, stops at corresponding ends of said scales for engagement with adjacent edges of a work piece, measuring edges on said guide member each arranged transversely of one of said scales, a sleeve for a center punch carried by said guide member and located concentrically with the point of intersection of lines projected from said measuring edges, and means carried by said guide member for clamping said scales in adjusted positions.

3. A center punch gauge comprising a guide member provided with guide channels for a pair of scales arranged at a predetermined mutual angle, relatively adjustable scales in said channels, stops at corresponding ends of said scales for engagement with edges of a work piece, two pairs of measuring edges on said guide member, one edge of each pair being arranged transversely of one of said scales, and a pair of punch sleeves carried by said guide member each located concentrically with respect to the point of intersection of lines projected from the measuring edges of one of said pairs of measuring edges.

4. A gauge of the character described comprising a pair of relatively slidable scales, means for guiding said scales in predetermined angular relationship, said means having measurement indicating means for each of said scales, and a center punch carried by said guiding means concentrically with respect to the point of intersection of lines projected from each of said indicating means in directions each normal to the respective scale.

5. A gauge of the character described adapted to be applied directly to a work piece comprising a pair of scales arranged at right angles one to the other, a guide member engaging said scales and enabling at least one of the same to be adjusted longitudinally with respect to said guide for indicating predetermined distances, a center punch sleeve carried by said guide and off-set from said scales, a stop member carried by one of said scales and adapted to engage an edge of the work piece for disposing said scale in a position normal to said edge and to locate said sleeve an indicated distance from said edge, and a stop member carried by said other scale and off-set laterally thereof into alignment with said sleeve and adapted to engage an adjacent edge of the work piece for locating said sleeve from said last mentioned edge a distance corresponding to the longitudinal adjustment of said last mentioned scale with reference to said guide.

6. A gauge of the character described comprising a scale provided with a head constituting a stop member provided with a straight edge disposed at right angles to the scale and adapted to abut a side of a work piece, a guide member carried by said scale, and a second scale carried by said guide member at right angles to said first scale and provided with a stop member, said guide member having a center punch sleeve offset laterally from said second scale and adapted to receive a center punch, the axial center of said sleeve being correlated with said scales whereby measurements indicated by the portions of the latter between said guide member and the respective stops represent the distances of the axial center of the sleeve from the respective edges of the work piece, said stop member of said second scale being offset laterally and from the plane of the scale for contacting an edge of the work piece at a point in a line parallel with the second scale and passing through said axial center of said sleeve.

ARTHUR M. MOSHER.